United States Patent [19]

Nakano

[11] Patent Number: 5,200,454
[45] Date of Patent: Apr. 6, 1993

[54] FLAME-RETARDANT RESIN COMPOSITION

[75] Inventor: Akikazu Nakano, Ichihara, Japan

[73] Assignee: Idemitsu Kosan Company Limited, Tokyo, Japan

[21] Appl. No.: 507,144

[22] Filed: Apr. 10, 1990

Related U.S. Application Data

[63] Continuation-in-part of Ser. No. 288,032, Dec. 21, 1988, abandoned.

[30] Foreign Application Priority Data

Jan. 14, 1988 [JP] Japan .................................. 63-4920

[51] Int. Cl.$^5$ ................... C08K 3/10; C08K 3/34; C08K 3/40
[52] U.S. Cl. ................... 524/409; 524/410; 524/411; 524/412; 524/451; 524/499; 524/519; 524/520
[58] Field of Search ................... 524/409, 520, 410, 411, 524/412, 451, 494, 519

[56] References Cited

U.S. PATENT DOCUMENTS

| | | | |
|---|---|---|---|
| 3,852,393 | 12/1974 | Furukawa et al. | 525/67 |
| 4,049,624 | 9/1977 | Anderson | 524/412 |
| 4,132,748 | 1/1979 | Arthur et al. | 524/409 |
| 4,301,058 | 11/1981 | Neukirchen et al. | 524/412 |
| 4,355,126 | 10/1982 | Haaf et al. | 524/412 |
| 4,525,508 | 6/1985 | Lee, Jr. | 524/409 |
| 4,563,496 | 1/1986 | Lindner et al. | 524/408 |
| 4,584,338 | 4/1986 | Liu | 525/71 |
| 4,649,168 | 3/1987 | Kress et al. | 524/405 |
| 4,666,958 | 5/1987 | Boyer | 524/409 |
| 4,666,965 | 5/1987 | Aoki | 524/412 |
| 4,680,353 | 7/1987 | Ishihara et al. | 526/293 |
| 4,716,196 | 12/1987 | Hilton et al. | 525/68 |
| 4,742,104 | 5/1988 | Lindner et al. | 524/409 |
| 4,749,745 | 6/1988 | Biglione et al. | 525/67 |
| 4,766,165 | 8/1988 | Kress et al. | 524/520 |
| 4,774,301 | 9/1988 | Campbell, Jr. et al. | 526/347.2 |
| 4,788,238 | 11/1988 | Todtemann et al. | 524/520 |
| 4,808,647 | 2/1989 | Abolins et al. | 524/409 |

FOREIGN PATENT DOCUMENTS

| | | |
|---|---|---|
| 62-104818 | 5/1987 | Japan . |
| 62-257948 | 11/1987 | Japan . |
| 62-257950 | 11/1987 | Japan . |
| 62-259402 | 11/1987 | Japan . |

OTHER PUBLICATIONS

Macromolecules—Crystalline Syndiotactic Polystyrene, vol. 19, pp. 2464–2465, Sep. 1986.
WPIL, File Supplier, No. 86-249848, Derwent Publications Ltd., London, GB; of JP-61 179 249 (Mitsui Toatsu Chem. Inc.) Nov. 8, 1986 Abstract.
WPIL, File Supplier, No. 87-353232, Derwent Publications Ltd., London, GB; of JP-A-62 257 950 (Idemitsu Kosan K.K.) Oct. 11, 1987.
WPIL, File Supplier, No. 87-353230, Derwent Publications Ltd., London, GB; of JP-A-62 257 948 (Idemitsu Kosan K.K.) Oct. 11, 1978.

*Primary Examiner*—Kriellion S. Morgan
*Attorney, Agent, or Firm*—Frishauf, Holtz, Goodman & Woodward

[57] ABSTRACT

The present invention relates to a flame-retardant resin composition having halogen content of 2 to 40% by weight basing on the amount of said composition, which comprises (a) 100 parts by weight of a styrene-based polymer having mainly syndiotactic configuration, or a mixture of 99 to 50% by weight of said styrene-based polymer and 1 to 50% by weight of a thermoplastic resin (exclusive of tetrafluoroethylene-based polymer) and/or rubber;

(b) 3 to 40 parts by weight of a flame retardant selected from the group consisting of halogenated polystyrenes and halogenated polyphenylene oxides and (c) 1 to 15 parts by weight of an auxiliary flame retardant, as main components.

In addition, the present invention contains the above components (a), (b) and (c) as main components, and further contains (d) 0.003 to 10 parts by weight of tetrafluoroethylene-based polymer and/or (e) 1 to 300 parts by weight of an inorganic filler.

The present invention provides a resin composition which is excellent in flame retardance and further in heat resistance.

38 Claims, No Drawings

FLAME-RETARDANT RESIN COMPOSITION

CROSS REFERENCE TO OTHER APPLICATION

This application is a Continuation-In-Part of application Ser. No. 07/288,032, filed Dec. 21, 1988, now abandoned.

BACKGROUND OF THE INVENTION

The present invention relates to a flame-retardant resin composition and more particularly to a resin composition which is excellent in flame retardance and further in heat resistance. Thus, moldings obtained using the resin composition of the present invention are useful as home electric appliances, electronic parts, car parts, construction materials and so forth.

Styrene-based resins are widely used in a wide variety of applications, for example, as home electric appliances, construction materials and further as interior materials because of their excellent properties.

The styrene-based resins, however, are easily combustible and their moldings once started to burn continue to burn even if the flame is removed. Because of this disadvantage, the styrene-based resins can be used only in limited applications.

While polystyrenes already on market, that is, atactic polystyrenes, and polycarbonate resin and ABS resin are non-crystalline, the styrene-based polymer having mainly syndiotactic configuration used in the present invention is crystalline.

As flame retardants to be compounded with the styrene-based polymer having mainly syndiotactic configuration, accordingly, those which might hinder the heat resistance attributed to crystallization as the feature of the styrene-based polymer having mainly syndiotactic configuration (abbreviated as SPS), in other words, those which might lower the Distortion-Temperature under Heat (H.D.T.) of SPS composition are not proper.

SPS compositions are used at high temperatures, making the best use of the heat resistance attributed to crystallization that is one of the characteristic features of SPS.

To compound a flame retardant with SPS, it is required to select a flame retardant that has not only flame retardance but also is free from bleeding out, discoloration of moldings or lowering in mechanical properties in any circumstances, and to determine the amount compounded. Consequently, in this respect it has been insufficient to merely select as flame retardant a compound which is high in melting point and decomposition temperature.

As a result of further investigations to overcome the above problems, specifically using a styrene-based polymer having mainly syndiotactic configuration which was developed by employee of the present assignee (see Japanese Patent Application Laid-Open No. 104818/1987), it has been found that a resin composition having the desired physical properties can be obtained by adding specified amounts of a specified flame retardant and auxiliary flame retardant to a styrene-based polymer having mainly syndiotactic configuration or a mixture of the styrene-based resin and a thermoplastic resin and/or rubber and, in particular, a resin composition containing a specified flame-retardant and an auxiliary flame retardant, polytetrafluoroethylene, in a specified ratio is effective in preventing melt dropping which is responsible for the spreading of fire of the resin composition.

SUMMARY OF THE INVENTION

The object of the present invention is to provide a resin composition which is excellent in flame retardance and further in heat resistance.

Firstly, the present invention relates to a flame-retardant resin composition having halogen content of 2 to 40% by weight basing on the amount of said composition, which comprises (a) 100 parts by weight of a styrene-based polymer having mainly syndiotactic configuration, or a mixture of 99 to 50% by weight of said styrene-based polymer and 1 to 50% by weight of a thermoplastic resin (exclusive of tetrafluoroethylene-based polymer) and/or rubber;

(b) 3 to 40 parts by weight of a flame retardant selected from the group consisting of (i) halogenated polystyrenes comprising a polymer consisting of one or more types of a structural unit expressed in a general formula:

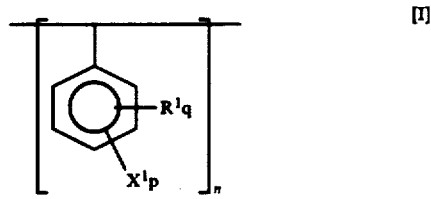

(where $X^1$ denotes a halogen atom, and $R^1$ denotes a hydrogen atom, an alkyl group having 1 to 10 carbon atoms, hydroxyl group or amino group, and also $1 \leq p \leq 5$, $0 \leq q \leq 4$, and n is 3 or greater integer, preferably 10 to 1000, or a copolymer of a structural unit expressed in said general formula [I] (where n is, in total of m described below, 3 or greater integer, preferably 10 to 10000), and a structural unit expressed in a general formula:

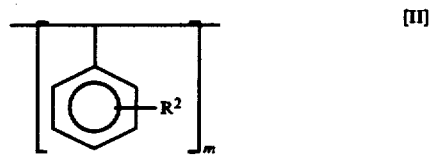

(where $R^2$ denotes a hydrogen atom, an alkyl group having 1 to 10 carbon atoms, hydroxyl group or amino group, and m is, in total of n in said general formula [I], 3 or greater integer, preferably 10 to 10,000, and the ratio of n and m is such that the former is 0.01 to 99.99 mol % of the total of the two); and (ii) halogenated polyphenylene oxides comprising a polymer consisting of one or more types of a structural unit expressed in a general formula:

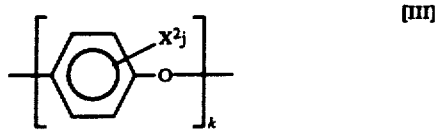

(where $X^2$ denotes a halogen atom, $1 \leq j \leq 4$, k is 3 or greater integer, preferably 3 to 1000), or a copolymer of structural unit expressed in said general formula [III] (where k is, in total of 1 described below, 3 or greater integer, preferably 3 to 1000), and a structural unit expressed in a general formula:

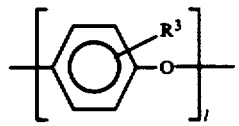

(where $R^3$ denotes a hydrogen atom or an alkyl group having 1 to 10 carbon atoms, and l is, in total of k in said general formula [III], 3 or greater integer, preferably 3 to 1000, and the ratio of k and l is such that the former is 0.01 to 99.99 mol % of the total of the two); and (c) 1 to 15 parts by weight of an auxiliary flame retardant.

Secondly, the present invention relates to a flame-retardant resin composition having halogen content of 2 to 40% by weight basing on the amount of said composition, which comprises (a) 100 parts by weight of a styrene-based polymer having mainly syndiotactic configuration, or a mixture of 99 to 50% by weight of said styrene-based polymer and 1 to 50% by weight of a thermoplastic resin (exclusive of tetrafluoroethylene-based polymer) and/or rubber;

(b) 3 to 40 parts by weight of a flame retardant selected from the group consisting of the halogenated polystyrenes and the halogenated polyphenylene oxides;

(c) 1 to 15 parts by weight of an auxiliary flame retardant; and (d) 0.003 to 10 parts by weight of tetrafluoroethylene based polymer.

Thirdly, the present invention relates to a flame-retardant resin composition having halogen content of 2 to 40% by weight basing on the amount of said composition, which comprises (a) 100 parts by weight of a styrene-based polymer having mainly syndiotactic configuration, or a mixture of 99 to 50% by weight of said styrene-based polymer and 1 to 50 by weight of a thermoplastic resin (exclusive of tetrafluoroethylene-based polymer) and/or rubber;

(b) 3 to 40 parts by weight of a flame retardant selected from the group consisting of the halogenated polystyrenes and the halogenated polyphenylene oxides;

(c) 1 to 15 parts by weight of an auxiliary flame retardant; and (e) 1 to 300 parts by weight of an inorganic filler.

Fourthly, the present invention relates to a flame-retardant resin composition having halogen content of 2 to 40% by weight basing on the amount of said composition, which comprises (a) 100 parts by weight of a styrene-based polymer having mainly syndiotactic configuration, or a mixture of 99 to 50% by weight of said styrene-based polymer and 1 to 50% by weight of a thermoplastic resin (exclusive of tetrafluoroethylene-based polymer) and/or rubber;

(b) 3 to 40 parts by weight of a flame retardant selected from the group consisting of the halogenated polystyrenes and the halogenated polyphenylene oxides;

(c) 1 to 15 parts by weight of an auxiliary flame retardant;

(d) 0.003 to 10 parts by weight of tetrafluoroethylene-based polymer; and (e) 1 to 300 parts by weight of an inorganic filler.

DETAILED DESCRIPTION OF THE INVENTION

The flame-retardant resin composition of the present invention contains the above components (a), (b) and (c) as main components.

The component (a) is a styrene-based polymer having mainly the syndiotactic configuration, or a mixture of the styrene-based polymer and a thermoplastic resin and/or rubber.

The styrene-based polymer having mainly syndiotactic configuration means a polymer having configuration that with respect to a main chain comprising a carbon-carbon bond, phenyl groups or substituted phenyl groups as side chains are positioned alternately in the opposite directions. The tacticity is determined by the nuclear magnetic resonance method using a carbon isotope (the $^{13}$C-NMR method).

The tacticity as determined by the $^{13}$C-NMR method can be indicated in terms of the proportions of a plurality of continuous constitutional units, for example, diad when two constitutional units are continuously linked to each other, triad when three constitutional units are continuously linked to each other, or pentad when five constitutional units are continuously linked to each other.

The styrene-based polymer having mainly syndiotactic configuration to be used in the present invention includes polystyrene, poly(alkylstyrene), poly(-halogenated styrene), poly(alkoxystyrene), poly(vinyl benzoate) and their mixtures, and copolymers containing the above monomer as the main component, each usually having a syndiotacticity that the proportion of diad is at least 75% and preferably at least 85%, or the proportion of pentad (racemic pentad) is at least 30% and preferably at least 50%.

Typical examples of the poly(alkylstyrene) are polymethylstyrene, polyethylstyrene, polyisopropylstyrene, polytert-butylstyrene and the like. Typical examples of the poly(halogenatedstyrene) are polychlorostyrene, polybromostyrene, polyfluorostyrene and the like. Typical examples of the poly(alkoxystyrene) are polymethoxystyrene, polyethoxystyrene and the like. Particularly preferred examples of the styrene-based polymers are polystyrene, poly-p-methylstyrene, poly-m-methylstyrene, poly-p-tert-butylstyrene, poly-p-chlorostyrene, poly-m-chlorostyrene, poly-p-fluorostyrene, and a copolymer of styrene and p-methylstyrene.

The styrene-based polymer to be used in the present invention varies in molecular weight. The weight average molecular weight of the styrene-based polymer is preferably at least 50,000 and particularly preferably at least 100,000. If the weight average molecular weight is less than 50,000, the styrene-based polymer is not sufficiently high in heat resistance and mechanical strength, and the resulting composition is not sufficiently improved in heat resistance and mechanical strength.

The styrene-based polymer to be used in the present invention is not critical in a distribution of molecular weight, and those having various distributions of molecular weight can be used.

The upper limit of the weight average molecular weight of the styrene-based polymer is usually about 1,000,000 although it is not limited thereto.

The styrene-based polymer having mainly syndiotactic configuration has a melting point of 160° to 310° C. and thus is much superior in heat resistance to the conventional styrene-based polymers having the atactic configuration.

The styrene-based polymer having mainly syndiotactic configuration can be prepared, for example, by polymerizing a styrene-based monomer (corresponding to the above styrene-based polymers) by the use of a catalyst comprising a titanium compound and a condensate of trialkylaluminum and water in the presence or absence of an inert hydrocarbon solvent (see Japanese Patent Application Laid-Open No. 187708/1987).

As the component (a) of the present invention, the styrene-based polymer having mainly syndiotactic configuration is used alone or in combination with other thermoplastic resins and/or rubber.

A suitable thermoplastic resin is chosen depending on the purpose of use of the composition and so forth. For example, styrene-based polymers such as polystyrene having an atactic configuration, polystyrene having an isotactic configuration, an AS resin and an ABS resin can be used. In addition, polyesters such as polyethylene terephthalate, polycarbonate, polyethers such as polyphenyleneoxide, polysulfone and polyethersulfone, condensed polymers such as polyamide, polyphenylenesulfide (PPS) and polyoxymethylene, acryl-based polymers such as polyacrylic acid, polyacrylate and polymethyl methacrylate, polyolefins such as polyethylene, polypropylene, polybutene, poly(4-methylpentene-1) and an ethylene propylene copolymer, halogen-containing vinyl compound polymers such as polyvinyl chloride, polyvinylidene chloride, and polyvinylidene fluoride and the like can be used.

Of these polymers, polycarbonate, polyester, ABS, polyether, polyphenylenesulfide and the like are preferred.

Various types of rubber can be used. Of these, a rubber-like copolymers containing a styrene-based compound as one component are most suitable. Examples of rubber-like copolymers are a styrene-butadiene copolymer rubber (SBR), a rubber obtained by partially or completely hydrogenating the butadiene portion of a styrene-butadiene block copolymer rubber (SEBS), a styrene-isoprene block copolymer rubber, a rubber obtained by partially or completely hydrogenating the isoprene portion of a styrene-isoprene block copolymer.

In addition, as described in the specification of Japanese Patent Application No. Sho. 63-121700, granular elastomers obtained by polymerizing a vinyl-based monomer in the presence of a polymer obtained by polymerizing one or more monomers selected from the group consisting of alkyl acrylate, alkyl methacrylate and a polyfunctional monomer having a conjugated diene type double bond, e.g., acrylonitrile-styrene grafted butadiene rubber (ABS), acrylonitrile-styrene grafted butadiene-butyl acrylate copolymer rubber (AABS), methyl methacrylate-styrene grafted butyl acrylate rubber (MAS), styrene grafted butadiene rubber (SB), methyl methacrylate-styrene grafted butadiene rubber (MBS), and methyl methacrylate-styrene grafted butadiene-butyl acrylate copolymer rubber (MABS) can be used as rubber-like copolymer.

Since the above rubber-like copolymers have a styrene unit, they exhibit good dispersibility to the styrene-based polymer having mainly syndiotactic configuration to be used as the component (a), and thus greatly improve physical properties. Other rubbers which can be used include natural rubber, polybutadiene, polyisoprene, polyisobutylene, neoprene, ethylenepropylene copolymer rubber, polysulfide rubber, thiokole rubber, acryl rubber, urethane rubber, silicone rubber, epichlorohydrin rubber, polyether-ester rubber, polyester-ester rubber, and mixtures thereof.

When the thermoplastic resin and/or rubber is used as a mixture with the styrene-based polymer having mainly syndiotactic configuration, the thermoplastic resin and/or rubber is added in an amount of 1 to 50% by weight, preferably 1 to 40% by weight and more preferably 1 to 30% by weight of the mixture. If the amount is less than 1% by weight, the objective effects cannot be obtained, and there is no significant difference in properties between the resulting composition and the styrene-based polymer having mainly syndiotactic configuration alone. On the other hand, if it is more than 50% by weight, no improvement in thermal properties can be expected.

A flame retardant selected from the group consisting of halogenated polystyrenes and halogenated polyphenylene oxides is used as the component (b) of the present invention.

The halogenated polystyrenes comprises a polymer consisting of one or more types of a structural unit expressed in a general formula.

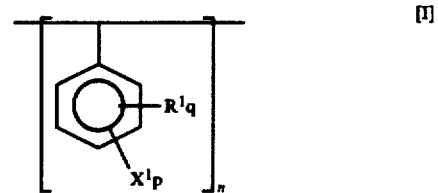

[I]

(where $X^1$ denotes a halogen atom, and $R^1$ denotes a hydrogen atom, an alkyl group having 1 to 10 carbon atoms, hydroxyl group or amino group, and also $1 \leq p \leq 5$, $0 \leq q \leq 4$, and n is 3 or greater integer, preferably 10 to 1000, or a copolymer of a structural unit expressed in said general formula [I] (where n is, in total of m described below, 3 or greater integer, preferably 10 to 10,000), and a structural unit expressed in a general formula:

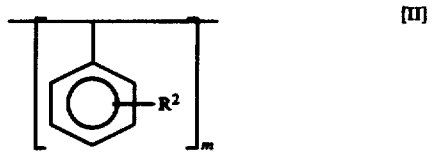

[II]

(where $R^2$ denotes a hydrogen atom, an alkyl group having 1 to 10 carbon atoms, hydroxyl group or amino group, and m is, in total of n in said general formula [I], 3 or greater integer, preferably 10 to 10,000, and the ratio of n and m is such that the former is 0.01 to 99.99 mol % of the total of the two).

In such halogenated polystyrenes as described herein, the structure of the principal chain may be atactic structure, isotactic structure or syndiotactic structure. Besides, in the above fromulae, p should be 2 or more, that is, two or more halogen substitutes are desired, and in particular trihalogen substitutes are preferable.

Practical examples of halogenated polystyrenes are to include polychlorostyrene, polybromostyrene, polyiodostyrene, polyfluorostyrene, polydichlorostyrene, polydibromostyrene, polydiiodostyrene, polydifluorostyrene, polytrichlorostyrene, polytribromostyrene, polytriiodostyrene, polytrifluorostyrene, polytetrachlorostyrene, polytetrafluorostyrene, polypentachlorostyrene, polypentafluorostyrene, polybromohydroxystyrene, and polydibromohydroxystyrene.

In the above halogenated polystyrenes, in particular polybromostyrene, polydibromostyrene, polytribromostyrene, polybromohydroxystyrene, and polydibromohydroxystyrene are preferable.

The halogenated polyphenylene oxides comprises a polymer consisting of one or more types of a structural unit expressed in a general formula:

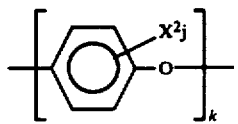

[III]

(where $X^2$ denotes a halogen atom, $1 \leq j \leq 4$, k is 3 or greater integer, preferably 3 to 1000), or a copolymer of structural unit expressed in said general formula [III] (where k is, in total of l described below, 3 or greater integer, preferably 3 to 1000), and a structural unit expressed in a general formula:

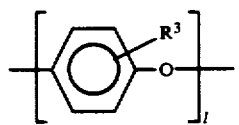

[IV]

(where $R^3$ denotes a hydrogen atom or an alkyl group having 1 to 10 carbon atoms, and l is, in total of k in said general formula [III], 3 or greater integer, preferably 3 to 1000, and the ratio of k and l is such that the former is 0.01 to 99.99 mol % of the total of the two).

In such halogenated polyphenylene oxides as described herein, j is preferably 2 or more.

Practical examples of halogenated polyphenylene oxides are to include polybromophenylene oxide, polychlorophenylene oxide, polyiodophenylene oxide, polydibromophenylene oxide, polydichlorophenylene oxide, polydiiodophenylene oxide, polytribromophenylene oxide, and polytrichlorophenylene oxide.

In the above halogenated polyphenylene oxides, in particular polybromophenylene oxide, polydibromophenylene oxide and polytribromophenylene oxide are preferable.

The amount of the component (b) (flame retardant) added is 3 to 40 parts by weight, preferably 5 to 35 parts by weight, and more preferably 11 to 35 parts by weight per 100 parts by weight of the component (a). If the amount of the component (b) added is less than 3 parts by weight, the resulting resin composition is not sufficiently satisfactory in flame retardance. On the other hand, if it is more than 40 parts by weight, flame retardance is not further improved and on the contrary, other mechanical properties are undesirably deteriorated.

The type and the amount of the component (b) must be determined appropriately depending on the purpose of use and so forth. For example, in applications where heat resistance is important, such as home electric appliances, high melting compounds (m.p., more than 250° C.) such as decabromodiphenyl ether and hexabromobenzene are used. When it suffices that flame retardance corresponding to V-2 of UL standards is obtained, the amount of the component (b) is preferably about 3 to 10 parts by weight. When flame retardance corresponding to V-1 to V-0 is needed, the amount of the component (b) is preferably 11 to 40 parts by weight.

In the present invention, the auxiliary flame retardant is needed to use as the component (c) in combination with the component (b). The objective effects cannot be obtained if only one of the components (b) and (c) is used.

Various auxiliary flame retardants can be used as the component (c). For example, antimony-containing auxiliary flame retardants, e.g., antimony trioxide, antimony pentaoxide, sodium antimonate, metallic antimony, antimony trichloride, antimony pentachloride, antimony trisulfide, and antimony pentasulfide can be used. In addition, zinc borate, barium metaborate and zirconium oxide can be used. Of these compounds, antimony trioxide ($Sb_2O_3$) antimony pentaoxide ($Sb_2O_5$) and sodium meta antimonate ($NaSbO_3$) is preferably used as the component (c).

The amount of the component (c) added is 1 to 15 parts by weight, preferably 2 to 10 parts by weight and more preferably 3 to 8 parts by weight per 100 parts by weight of the component (a).

If the amount of the component (c) added is less than 1 part by weight, the effect as the auxiliary flame retardant cannot be obtained sufficiently. On the other hand, even if the component (c) is added in an amount greater than 15 parts by weight, no additional effect can be obtained, and rather other physical properties are undesirably likely to be deteriorated.

In the case that a tetrafluoroethylene-based polymer is used as the component (d) of the present invention, melt dropping of the resin can be inhibited during its burning and thus the spreading of fire due to the melt dropping can be effectively prevented.

Specific examples of the tetrafluoroethylene-based polymer are a tetrafluoroethylene homopolymer (polytetrafluoroethylene), a copolymer of tetrafluoroethylene and hexafluoropropylene, and a tetrafluoroethylene copolymer containing a small amount of a copolymerizable ethylenically unsaturated monomer. The fluorine content of the tetrafluoroethylene-based polymer is 65 to 76% by weight and preferably 70 to 76% by weight.

The amount of the component (d) compounded is 0.003 to 10 parts by weight, preferably 0.02 to 2 parts by weight and more preferably 0.1 to 2 parts by weight per 100 parts by weight of the component (a). If the amount of the component (d) compounded is less than 0.003 part by weight, the melt dropping-preventing effect cannot be obtained. Further, an inorganic filler can be used as the component (e) of the present invention. The inorganic filler is not critical in form; that is, it may be fibrous, granular or powdery. Examples of fibrous inorganic fillers include glass fibers, carbon fibers, alumina fibers and the like. Particularly preferred are glass fibers and carbon fibers. The form of the glass fibers includes a cloth form, a mat form, bundle cut form, a short fiber form and a filament form. It is preferred for the glass fiber to be of the bundle cut form and to have a length of 0.05 to 13 mm and a fiber diameter of 5 to 20 μm. Particularly preferably the glass fiber is subjected to silane treatment.

As the carbon fiber, a polyacrylonitrile (PAN)-based fiber is preferred. More preferably the carbon fiber is of the chopped fiber type and is a bundle of fibers each having a length of about 3 mm and a diameter of 7 to 15 μm.

As the granular or powdery inorganic filler, talc, carbon black, graphite, titanium dioxide, silica, mica, calcium carbonate, calcium sulfate, barium sulfate, magnesium carbonate, magnesium sulfate, barium sulfate, oxy sulfate, tin oxide, alumina, kaolin, silicon carbide, metal powder and the like can be used. Talc, calcium carbonate and mica are preferred. The average particle diameter of talc is preferably 0.3 to 20 μm and more preferably 0.6 to 10 μm.

The preferred average particle diameter of calcium carbonate is 0.1 to 20 μm. The average particle diameter of mica is preferably 40 to 250 μm and more preferably 50 to 150 μm.

The amount of the inorganic filler compounded is 1 to 300 parts by weight, preferably 10 to 250 parts by weight and more preferably 10 to 100 parts by weight per 100 parts by weight of the component (a). If the amount of the inorganic filler compounded is less than 1 part by weight, no sufficient effect as a filler can be obtained. On the other hand, if it is more than 300 parts by weight, uniform dispersion cannot be obtained and a composition having a poor mechanical strength is likely to be obtained.

The flame-retardant resin composition of the present invention contains the components (a) to (c) and, if necessary, further the components (d) and (e). In addition, various additives or other synthetic resins can be added, if necessary, unless they impair the objects of the present invention. Examples of such additives include phosphorous acid ester or phosphoric acid ester-based antioxidants, benzotriazole or benzophenone-based ultraviolet ray absorbers, aliphatic carboxylic acid ester or paraffin-based external lubricants, lubricating agents, releasing agents, antistatic agents, and coloring agents.

The resin composition of the present invention can be obtained by compounding the components (a) to (c) and in some cases, further the components (d) and (e), and if necessary, further various additives, and kneading at a suitable temperature, for example, at 270° to 320° C. In this case, compounding and kneading can be carried out by the usual method. More specifically, it can be carried out by the melt kneading method or the solution blending method, using a kneader, a mixing roll, an extruder, a Bambury's mixer, a Henschel mixer and a kneading roll.

In the present invention, it is necessary that halogen content of the resin composition is set to 2 to 40% by weight, preferably 2 to 30% by weight basing on the amount of the resin composition. More particularly, it is preferable that bromine content is in the range of 2 to 30% by weight or chlorine content is in the range of 4 to 40% by weight basing on the amount of the resin composition.

If the halogen content of the resin composition is less than 2% by weight, the resulting resin composition is not sufficiently satisfactory in flame retardance because it is not sufficient in an amount of formation of gaseous halide, which halide cut off the polymer from heat and oxygen.

On the other hand, said halogen content is more than 40% by weight, mechanical properties are undesirably likely to deteriorated, and heat resistance or chemical resistance of which properties are inherent to SPS resin, is undesirably likely to deteriorated while it is sufficiently satisfactory in flame retardance.

The present invention provides a resin composition which is excellent in flame retardance and further in heat resistance.

Especially, the resin composition of the present invention have high heat-distortion temperatures and are free from the problems such as bleeding out or remarkable reduction in mechanical properties, even in a heat resistance test at a high temperature of 150° C. because above described flame retardants are used as the component (b).

Accordingly, moldings obtained using the resin composition of the present invention are of high safety against fire and thus can be widely used as home electric applicances, construction materials and so forth.

The present invention is described in greater detail with reference to the following examples.

REFERENCE EXAMPLE 1

Production of Polystyrene having Syndiotactic Configuration

In a reactor were placed 2 l of toluene as a solvent and 5 mmol of tetraethoxytitanium and 500 mmol as aluminum atom of methylaluminoxane as catalyst components, and at 50° C., 15 l of styrene was introduced and polymerized for 4 hours.

After the reaction was completed, the product was washed with a hydrochloric acid/methanol mixture to decompose and remove the catalyst components, and then dried to obtain 2.5 kg of a styrene-based polymer (polystyrene). The polymer was extracted with methyl ethyl ketone in a Soxhlet to obtain an extraction residue of 95% by weight. The weight average molecular weight of the polymer was 800,000. In a $^{13}$C-NMR analysis (solvent: 1,2-dichlorobenzene), an absorption ascribable to the syndiotactic configuration was observed at 145.35 ppm. The syndiotacticity in racemi pentad as calculated from the peak area was 96%.

EXAMPLES 1 TO 9, AND COMPARATIVE EXAMPLES 1 TO 10

As shown in Table 1, polystyrene having syndiotactic configuration (hereinafter abbreviated as SPS) produced as in Reference Example 1 of the present invention, thermoplastic resin, rubber, inorganic filler, flame retardant, auxiliary flame retardant and polytetrafluoroethylene were compounded in the proportion shown in Table 1, and kneaded at 290° C. for 5 minutes by the use of a labo plast mill. After kneading, the mixture was molded at 300° C. by the use of a molding machine. The molding resulted was determined for distortion-temperature under heat in the following manner, and subjected to heat resistance test. At the same time, flame retardance as determined according to UL 94 Standards (Thickness of sample: 1/16 inches) was evaluated. The result is shown in Table 2.

Distortion-Temperature Under Heat

Measured according to JIS K 7207.

Heat Resistance Test (1) Detection of Bleed Out of Flame Retardant

Conditions for test: After heat resistance test was conducted at 150° C. for one hour under N$_2$ atmosphere, the existence of bleeding out of flame retardant was judged visually.

(2) Retention of Modulus of Elasticity in Bending

The modulus of elasticity in bending after heat resistance test under the abovementioned test conditions (strength after test) and modulus of elasticity in bending before test (initial strength) were each determined according to ASTM-D-790-71, and calculated by the following equation.

Retention of Modulus elasticity in bending (%) =

$$\frac{\text{Strength after test}}{\text{Initial strength}} \times 100$$

Flame Retardance Test

Evaluated according to UL 94 Standards (Thickness of sample: 1/16 inches).

TABLE 1

| | SPS*[1] (parts by weight) | Thermoplastic Resin*[2] | | Rubber*[3] | | Flame Retardant*[4] | | Auxilliary Flame Retardant | | Tetrafluoroethylene-Based Polymer*[5] (parts by weight) | Inorganic Filler*[6] | |
|---|---|---|---|---|---|---|---|---|---|---|---|---|
| | | Type | Amount (parts by weight) | Type | Amount (parts by weight) | Type | Amount (parts by weight) | Type | Amount (parts by weight) | | Type | Amount (parts by weight) |
| Example 1 | 100 | — | — | — | — | A | 23 | $Sb_2O_3$ | 6 | — | GF | 55 |
| Example 2 | 100 | — | — | — | — | B | 23 | " | 6 | — | GF | 55 |
| Example 3 | 100 | — | — | — | — | A | 23 | " | 6 | 0.2 | GF | 55 |
| Example 4 | 90 | — | — | SB | 10 | A | 23 | " | 6 | — | GF | 55 |
| Example 5 | 70 | — | — | SB | 30 | A | 23 | " | 6 | — | GF | 55 |
| Example 6 | 70 | PPS | 30 | — | — | A | 23 | " | 6 | — | GF | 55 |
| Example 7 | 100 | — | — | — | — | A | 35 | " | 6 | — | { GF CC | { 180 110 |
| Example 8 | 100 | — | — | — | — | A | 23 | " | 6 | — | GF | 55 |
| Example 9 | 100 | — | — | — | — | A | 10 | " | 6 | — | GF | 55 |
| Comparative Example 1 | 100 | — | — | — | — | $C_1$ | 23 | " | 6 | — | GF | 55 |
| Comparative Example 2 | 100 | — | — | — | — | $C_1$ | 23 | " | 6 | 0.2 | GF | 55 |
| Comparative Example 3 | 100 | — | — | — | — | $C_2$ | 23 | " | 6 | — | GF | 55 |
| Comparative Example 4 | 100 | — | — | — | — | $D_1$ | 23 | " | 6 | — | GF | 55 |
| Comparative Example 5 | 100 | — | — | — | — | $D_2$ | 23 | " | 6 | — | GF | 55 |
| Comparative Example 6 | 100 | — | — | — | — | $E_1$ | 23 | " | 6 | — | GF | 55 |
| Comparative Example 7 | 100 | — | — | — | — | $E_2$ | 23 | " | 6 | — | GF | 55 |
| Comparative Example 8 | 100 | — | — | — | — | $E_3$ | 23 | " | 6 | — | GF | 55 |
| Comparative Example 9 | 100 | — | — | — | — | F | 23 | " | 6 | — | GF | 55 |
| Comparative Example 10 | 100 | — | — | — | — | F | 10 | " | 6 | — | GF | 55 |

*[1]SPS: Styrene polymer having syndiotactic configuration produced in Reference Example 1 of the present invention
*[2]Thermoplastic Resin PPS: Polyphenyleneesulfide (intrinsic viscosity [η]: 0.18 dl/g
*[3]Rubber SB: Styrene grafted butadiene rubber (particle diameter: 0.7 μm; trade name: Methaburene IP-2; produced by Mitsubishi Rayon Co., Ltd.)
*[4]Flame Retardant
A: Halogenated polystyrene Polytribromostyrene (halogen content: 68%; trade name: PYRO-CHEK ® 68PB; produced by Nissan Fero Corp.)
B: Poly (halogenated phenyleneoxide)
Poly(dibromophenyleneoxide) (halogen content: 62%; trade name: GLC PO-64P; produced by Great Lake Corp.)
C: Diphenyl ether-based flame retardant
$C_1$ Decabromodiphenyl ether (halogen content: 83%; trade name: GLC DE-83R; produced by Great Lake Corp.)
$C_2$ Octabromodiphenyl ether (halogen content: 73%; trade name: GLC DE-79; produced by Great Lake Corp.)
D: Bisphenoxy ethane based flame retardant
$D_1$ Bis(tribromophenoxy)ethane (halogen content: 70%; trade name: GLC FE680; produced by Great Lake Corp.)
$D_2$ Bis(pentabromophenoxy)ethane (halogen content: 77%; trade name: PYRO-CHEK ® 77B; produced by Nissan Fero Corp.)
E: Bisphenol A - based flame retardant
$E_1$ Tetrabromobisphenol A (halogen content: 58%; trade name: GLC BA-59F; produced by Great Lake Corp.)
$E_2$ Tetrabromobisphenol A oligomer (halogen content: 55%; trade name: FR-30; produced by Mitsubishi Gas Chemical Company, Inc.)
$E_3$ Tetrabromobisphenol S (halogen content: 55%; trade name: TB 2; produced by Matsunaga Chemical Industries.)
F: Halogenated phenyl - based flame retardant Hexabromobenzene (halogen content: 84%; trade name: HBB; produced by Matsunaga Chemical Industries.)
*[5]Tetrafluoroethylene-based polymer Polytetrafluoroethylene (produced by Du Pont Corp.; trade name: Teflon)
*[6]Inorganic Filler
GF: Glass fiber (CS03 MA 429A, produced by Asahi Fiber Co., Ltd.; fiber length: 3mm; fiber diameter; 13 μm)
CC: Calcium Carbonate

TABLE 2

| | Distortion-Temperature under Heat (°C.) [18.6 kg/cm$^2$] | Heat Resistance Test | | Flame Retardance Evaluation of UL 94 |
|---|---|---|---|---|
| | | Detection of bleed out of flame retardant | Retention of Modulus of Elasticity in Bending (%) | |
| Example 1 | 248 | Non-Existence | 100 | V-0 |
| Example 2 | 248 | " | 100 | " |
| Example 3 | 249 | " | 100 | " |
| Example 4 | 261* | " | 97 | " |
| Example 5 | 258* | " | 96 | " |

TABLE 2-continued

| | Distortion-Temperature under Heat (°C.) [18.6 kg/cm²] | Heat Resistance Test | | Flame Retardance |
| --- | --- | --- | --- | --- |
| | | Detection of bleed out of flame retardant | Retention of Modulus of Elasticity in Bending (%) | Evaluation of UL 94 |
| Example 6 | 255 | " | 100 | " |
| Example 7 | 260 | " | 100 | " |
| Example 8 | 235* | " | 100 | " |
| Example 9 | 251 | " | 100 | " |
| Comparative Example 1 | 235 | Existence | 94 | V-2 |
| Comparative Example 2 | 236 | " | 96 | V-0 |
| Comparative Example 3 | 228 | " | 93 | " |
| Comparative Example 4 | 231 | " | 94 | " |
| Comparative Example 5 | 238 | " | 95 | " |
| Comparative Example 6 | 237 | " | 92 | " |
| Comparative Example 7 | 234 | " | 93 | " |
| Comparative Example 8 | 235 | " | 96 | " |
| Comparative Example 9 | 234 | " | 92 | " |
| Comparative Example 10 | 224* | " | 91 | V-2 |

*Numerical value measured under a bending stress of 4.6 kg/cm².

What is claimed is:

1. A flame-retardant resin composition having a halogen content of 2 to 40% by weight based on the amount of said composition, which comprises
   (a) 100 parts by weight of a styrene-based polymer having mainly syndiotactic configuration, or a mixture of 99 to 50% by weight of said styrene-based polymer and 1 to 50% by weight of a thermoplastic resin, exclusive of tetrafluoroethylene-based polymer, and/or rubber;
   (b) 3 to 40 parts by weight of a flame retardant selected from the group consisting of
   (i) halogenated polystyrenes comprising a polymer consisting of one or more types of a structural unit expressed in formula (I):

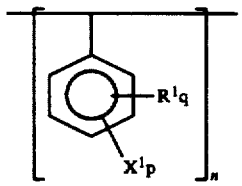

(I)

where $X^1$ denotes a halogen atom, and $R^1$ denotes a hydrogen atom, an alkyl group having 1 to 10 carbon atoms, hydroxyl group or amino group, and also $1 \leq p \leq 5$, $0 \leq q \leq 4$, and n is an integer of 3 to 10,000; or a copolymer of a structural unit expressed in said formula (I) with a structural unit expressed in formula (II)

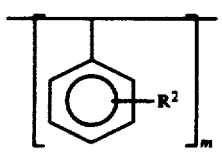

(II)

where $R^2$ denotes a hydrogen atom, an alkyl group having 1 to 10 carbon atoms, hydroxyl group or amino group, and the total of m and n is 3 to 10000, and the ratio of n and m is such that the former is 0.01 to 99.99 mol % of the total of the two; and
   (ii) halogenated polyphenylene oxides comprising a polymer consisting of one or more types of a structural unit expressed in a formula (III):

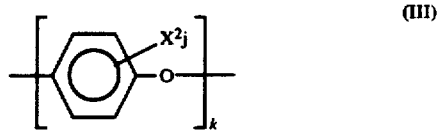

(III)

where $X^2$ denotes a halogen atom, $1 \leq j \leq 4$, k is an integer of 3 to 1000; or a copolymer of the structural unit expressed in said formula (III) and a structural unit expressed in formula (IV):

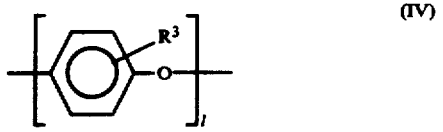

(IV)

where $R^3$ denotes a hydrogen atom or an alkyl group having 1 to 10 carbon atoms, and the total of k and l is 3 to 1,000, and the ratio of k and l is such that the former is 0.01 to 99.99 mol % of the total of the two; and
   (c) 1 to 15 parts by weight of an auxiliary flame retardant.

2. The composition as claimed in claim 1, wherein n is an integer of 10 to 10,000 or the total of n and m is 10 to 10,000.

3. The flame retardant resin composition of claim 1 further comprising
   (d) 0.003 to 10 parts by weight of a tetrafluoroethylene based polymer.

4. The composition as claimed in claim 3, wherein n is an integer of 10 to 10,000 or the total of n and m is 10 to 10,000.

5. The flame retardant resin composition of claim 1 further comprising
(e) 1 to 300 parts by weight of an inorganic filler.

6. The composition as claimed in claim 5, wherein n is an integer of 10 to 10,000 or the total of n and m is 10 to 10,000.

7. The flame retardant resin composition of claim 1 further comprising
(d) 0.003 to 10 parts by weight of a tetrafluoroethylene based polymer; and
(e) 1 to 300 parts by weight of an inorganic filler.

8. The composition as claimed in claim 7, wherein n is an integer of 10 to 10,000 or the total of n and m is 10 to 10,000.

9. The composition as claimed in claim 1, wherein (a) is a mixture of (i) said styrene based polymer and (ii) thermoplastic resin which is at least one compound selected from the group consisting of styrene-based polymer other than component (a), polyester, polycarbonate, polyether, ABS resin and polyphenylenesulfide.

10. The composition as claimed in claim 1, wherein (a) is a mixture of (i) said styrene based polymers and (ii) rubber which is styrene grafted butadiene rubber, methyl methacrylate-n-butyl acrylate-styrene copolymer, styrene-hydrogenated butadiene block copolymer or styrene-butadiene block copolymer.

11. The composition as claimed in claim 1, wherein (a) is a mixture of 99 to 60% by weight of said styrene-based polymer and 1 to 40% by weight of said thermoplastic resin (exclusive of tetrafluoroethylene-based polymer) and/or said rubber.

12. The composition as claimed in claim 1, wherein the halogen content of the composition is 2 to 30% by weight.

13. The composition as claimed in claim 1, wherein the auxiliary flame retardant is antimony-containing auxiliary flame retardant.

14. The composition as claimed in claim 1, wherein the auxiliary flame retardant is antimony trioxide, antimony pentaoxide or sodium metaantimonate.

15. The composition as claimed in claim 3, wherein the styrene-based polymer having mainly syndiotactic configuration have 50,000 to 1,000,000 of weight average molecular weight.

16. The composition as claimed in claim 3, wherein (a) is a mixture of (i) said styrene based polymer and (ii) thermoplastic resin which is at least one compound selected from the group consisting of styrene-based polymer other than component (a), polyester, polycarbonate, polyether, ABS resin and polyphenylenesulfide.

17. The composition as claimed in claim 3, wherein (a) is a mixture of (i) said styrene based polymers and (ii) rubber which is rubber-like copolymer containing a styrene-based compound as one component.

18. The composition as claimed in claim 11, wherein the rubber-like copolymer is styrene grafted butadiene rubber, methyl methacrylate-n-butyl acrylate-styrene copolymer, styrene-hydrogenated butadiene block copolymer or styrene-butadiene block copolymer.

19. The composition as claimed in claim 3, wherein (a) is a mixture of 99 to 60% by weight of said styrene-based polymer and 1 to 40% by weight of said thermoplastic resin (exclusive of tetrafluoroethylene-based polymer) and/or said rubber.

20. The composition as claimed in claim 3, wherein the halogen content of the composition is 2 to 30% by weight.

21. The composition as claimed in claim 3, wherein the auxiliary flame retardant is antimony-containing auxiliary flame retardant.

22. The composition as claimed in claim 3, wherein the auxiliary flame retardant is antimony trioxide, antimony pentaoxide or sodium metaantiomonate.

23. The composition as claimed in claim 3, wherein the tetrafluoroethylene-based polymer is tetrafluoroethylene homopolymer.

24. The composition as claimed in claim 5, wherein (a) is a mixture of (i) said styrene based polymer and (ii) thermoplastic resin which is at least one compound selected from the group consisting of styrene-based polymer other than component (a), polyester, polycarbonate, polyether, ABS resin and polyphenylenesulfide.

25. The composition as claimed in claim 5, wherein (a) is a mixture of (i) said styrene based polymers and (ii) rubber which is styrene grafted butadiene rubber, methyl methacrylate-n-butyl acrylate-styrene copolymer, styrene-hydrogenated butadiene block copolymer or styrene-butadiene block copolymer.

26. The composition as claimed in claim 5, wherein (a) is a mixture of 99 to 60% by weight of said styrene-based polymer and 1 to 40% by weight of said thermoplastic resin (exclusive of tetrafluoroethylene-based polymer) and/or said rubber.

27. The composition as claimed in claim 5, wherein the halogen content of the composition is 2 to 30% by weight.

28. The composition as claimed in claim 5, wherein the auxiliary flame retardant is antimony-containing auxiliary flame retardant.

29. The composition as claimed in claim 5, wherein the auxiliary flame retardant is antimony trioxide, antimony pentaoxide or sodium metaantimonate.

30. The composition as claimed in claim 5, wherein the inorganic filler is glass fiber or talc.

31. The composition as claimed in claim 7, wherein the styrene-based polymer having mainly syndiotactic configuration have 50,000 to 1,000,000 weight average molecular weight.

32. The composition as claimed in claim 7, wherein (a) is a mixture of (i) said styrene based polymer and (ii) thermoplastic resin which is at least one compound selected from the group consisting of styrene-based polymer other than component (a), polyester, polycarbonate, polyether, ABS resin and polyphenylenesulfide.

33. The composition as claimed in claim 7, wherein (a) is a mixture of (i) said styrene based polymers and (ii) rubber which is styrene grafted butadiene rubber, methyl methacrylate-n-butyl acrylate-styrene copolymer, styrene-hydrogenated butadiene block copolymer or styrene-butadiene block copolymer.

34. The composition as claimed in claim 7, wherein (a) is a mixture of 99 to 60% by weight of said styrene-based polymer and 1 to 40% by weight of said thermoplastic resin (exclusive of tetrafluoroethylene-based polymer) and/or said rubber.

35. The composition as claimed in claim 7, wherein the halogen content of the composition is 2 to 30% by weight.

36. The composition as claimed in claim 7, wherein the auxiliary flame retardant is antimony-containing auxiliary flame retardant.

37. The composition as claimed in claim 7, wherein the auxiliary flame retardant is antimony trioxide, antimony pentaoxide or sodium metaantimonate.

38. The composition as claimed in claim 7, wherein the inorganic filler is glass fiber or talc.

* * * * *

UNITED STATES PATENT AND TRADEMARK OFFICE
CERTIFICATE OF CORRECTION

PATENT NO. : 5,200,454
DATED : April 6, 1993
INVENTOR(S) : NAKANO

It is certified that error appears in the above-identified patent and that said Letters Patent is hereby corrected as shown below:

```
Column 15, line 56 (Claim 18):  delete "claim 11" and
                                insert  --claim 17--.
```

Signed and Sealed this

Twelfth Day of September, 1995

Attest:

BRUCE LEHMAN

*Attesting Officer*    *Commissioner of Patents and Trademarks*